(12) United States Patent
Korczak et al.

(10) Patent No.: US 7,090,174 B2
(45) Date of Patent: Aug. 15, 2006

(54) ANCHOR RAIL ADAPTER AND HANGER AND METHOD

(75) Inventors: Rick Korczak, Channahon, IL (US);
Kevin E. Linehan, Justice, IL (US);
Christopher R. Stockman, New Lenox, IL (US)

(73) Assignee: Andrew Corporation, Westchester, IL (US)

( * ) Notice: Subject to any disclaimer, the term of this patent is extended or adjusted under 35 U.S.C. 154(b) by 261 days.

(21) Appl. No.: 10/046,414

(22) Filed: Nov. 9, 2001

(65) Prior Publication Data

US 2003/0089828 A1    May 15, 2003

(51) Int. Cl.
*F16L 3/08*    (2006.01)

(52) U.S. Cl. .............................. 248/61; 248/58; 248/65

(58) Field of Classification Search .................. 248/62, 248/72, 63, 68.1, 74.1, 71, 231.81; 138/73, 138/106, 107
See application file for complete search history.

(56) References Cited

U.S. PATENT DOCUMENTS

| | | | |
|---|---|---|---|
| 333,119 A | 12/1885 | Ephraim | |
| 386,677 A | 1/1889 | Zimmerman | |
| 2,065,843 A | 12/1936 | Van Uum | |
| 2,397,680 A | 4/1946 | Morehouse | |
| 2,453,980 A | 11/1948 | Hartman | |
| 2,563,240 A | 8/1951 | Heath | 24/73 |
| 2,577,120 A | 12/1951 | Franz | |
| 2,682,385 A | 6/1954 | Schluter | |
| 2,716,703 A | 8/1955 | Kane | |
| 2,941,768 A | 6/1960 | Elms et al. | |
| 2,981,513 A | 4/1961 | Brown | |
| 3,131,447 A | 5/1964 | Tinnerman | |
| 3,154,281 A | 10/1964 | Frank | |
| 3,198,463 A | 8/1965 | Loudon | |
| 3,237,905 A | 3/1966 | Baker et al. | |
| 3,336,543 A | 8/1967 | Johnson et al. | |
| 3,345,706 A | 10/1967 | Stokes | |
| 3,346,863 A | 10/1967 | Siebold | |
| 3,444,596 A | 5/1969 | Soltysik | |
| 3,501,117 A | 3/1970 | Soltysik | |
| 3,536,281 A | 10/1970 | Meehan et al. | 248/73 |
| 3,549,787 A | 12/1970 | Churla, Jr. | |
| 3,822,411 A | 7/1974 | Merle | |

(Continued)

FOREIGN PATENT DOCUMENTS

CA    1000677    11/1976

(Continued)

OTHER PUBLICATIONS

European Search Report for Application No. EP 00 10 0368.

(Continued)

*Primary Examiner*—Kimberly Wood
*Assistant Examiner*—Steven Marsh
(74) *Attorney, Agent, or Firm*—Welsh & Katz

(57) ABSTRACT

An adapter and hanger mounts an associated article to an associated anchor rail. The anchor rail is formed as a U-shaped channel having a pair of upstanding, opposing legs, each leg having an inwardly extending wall and terminating in a downwardly oriented lip. The adapter includes a top surface, flanges depending from the top surface and mounting legs extending from the flanges. The mounting legs each have a hook-like portion for engaging a respective rail lip. The adapter is flexible to permit urging the flanges inwardly toward one another for inserting a portion of the mounting legs into the U-shaped channel, and is also resilient such that the hook like portions biasedly engage the rail lips. In one embodiment, a hanger is formed integral with the adapter.

12 Claims, 8 Drawing Sheets

U.S. PATENT DOCUMENTS

| | | | |
|---|---|---|---|
| 4,023,596 A | 5/1977 | Tate | |
| 4,047,133 A | 9/1977 | Merle | |
| 4,051,323 A | 9/1977 | Churla | |
| 4,175,728 A | 11/1979 | Ferguson | 269/91 |
| 4,194,380 A | 3/1980 | Brown et al. | |
| 4,211,381 A | 7/1980 | Heard | |
| 4,286,654 A | 9/1981 | Ruhe et al. | |
| 4,306,697 A | 12/1981 | Mathews | |
| 4,308,961 A | 1/1982 | Kunce | |
| 4,325,526 A | 4/1982 | Kitagawa | |
| 4,334,659 A | 6/1982 | Yuda | |
| 4,505,006 A | 3/1985 | Andre | |
| 4,540,959 A | 9/1985 | Saad | |
| 4,541,598 A | 9/1985 | Villanueva et al. | |
| 4,556,183 A | 12/1985 | Greenberger | |
| 4,557,447 A | 12/1985 | Combe | 248/74.1 |
| 4,572,466 A | 2/1986 | Yamaguchi et al. | |
| 4,642,585 A | 2/1987 | Saad | |
| 4,654,612 A | 3/1987 | Smith | |
| 4,763,132 A | 8/1988 | Juds et al. | |
| 4,813,639 A | 3/1989 | Midkiff et al. | |
| 4,832,207 A | 5/1989 | Alexander | |
| 4,840,584 A | 6/1989 | Cox | 439/538 |
| 4,869,378 A | 9/1989 | Miller | |
| 4,881,709 A | 11/1989 | Nakamura | |
| 4,909,464 A | 3/1990 | Levine et al. | |
| 4,958,792 A | 9/1990 | Rinderer | |
| 5,029,789 A | 7/1991 | Nourry et al. | |
| 5,098,054 A | 3/1992 | Dyer | |
| 5,108,055 A | 4/1992 | Kreinberg et al. | |
| 5,167,533 A | 12/1992 | Rauwolf | |
| 5,201,484 A | 4/1993 | Thoen | |
| 5,334,051 A | 8/1994 | Devine et al. | |
| 5,344,108 A * | 9/1994 | Heath | 248/300 |
| 5,393,021 A | 2/1995 | Nelson | |
| 5,411,356 A | 5/1995 | Travis et al. | |
| 5,487,518 A | 1/1996 | McCraney et al. | |
| 5,612,509 A | 3/1997 | Market | 174/53 |
| 5,638,672 A | 6/1997 | Furukawa | 59/78.1 |
| 5,697,589 A | 12/1997 | Garfinkle | |
| 5,850,056 A | 12/1998 | Harwath | |
| 5,918,842 A | 7/1999 | Garfinkle | |
| 5,967,468 A | 10/1999 | Veghte et al. | |
| 5,986,212 A | 11/1999 | Lhota | |
| 6,119,878 A | 9/2000 | Zen | |
| 6,131,866 A | 10/2000 | Kesinger | |
| 6,161,804 A | 12/2000 | Paske et al. | |
| 6,220,461 B1 | 4/2001 | Dickinson | |
| 6,257,530 B1 * | 7/2001 | Tsai | 248/73 |
| 6,354,543 B1 | 3/2002 | Paske | |
| 6,443,402 B1 | 9/2002 | Ferrill et al. | 248/65 |
| 2002/0005463 A1 | 1/2002 | Paske et al. | 248/74.1 |

FOREIGN PATENT DOCUMENTS

| | | |
|---|---|---|
| DE | 710034 | 9/1941 |
| DE | 6912883 | 3/1969 |
| DE | 2807119 | 8/1979 |
| DK | 168 882 | 10/1959 |
| EP | 0 183 394 A3 | 6/1986 |
| EP | 1 020 672 A1 | 7/2000 |
| EP | 1 096 594 A2 | 5/2001 |
| EP | 1 215 432 A2 | 6/2002 |
| FR | 2 417 870 | 10/1979 |
| FR | 2 483 541 | 12/1981 |
| JP | 05079580 A | 3/1993 |
| JP | 08004949 A | 1/1996 |
| UA | 1062633 | 3/1967 |
| UA | 2 014 644 A | 8/1979 |

OTHER PUBLICATIONS

ICESCo™ Accessories article "Universal Snap-In Hangers for Wireless Applications," undated.

* cited by examiner

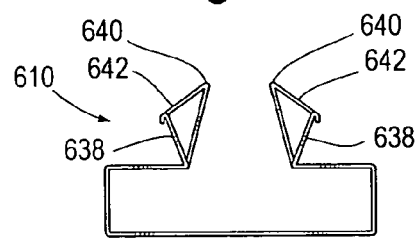
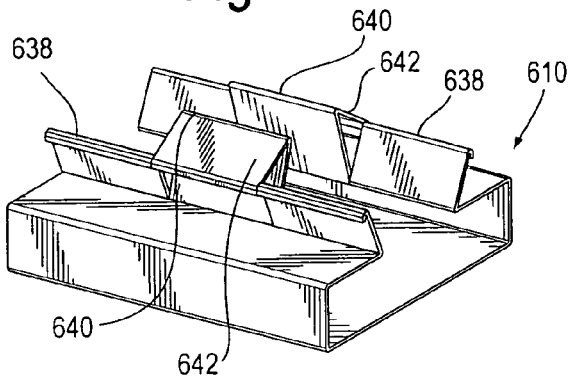
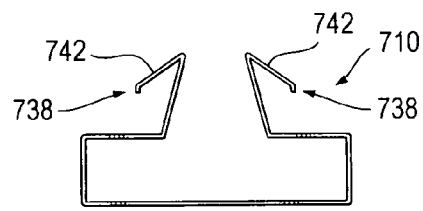
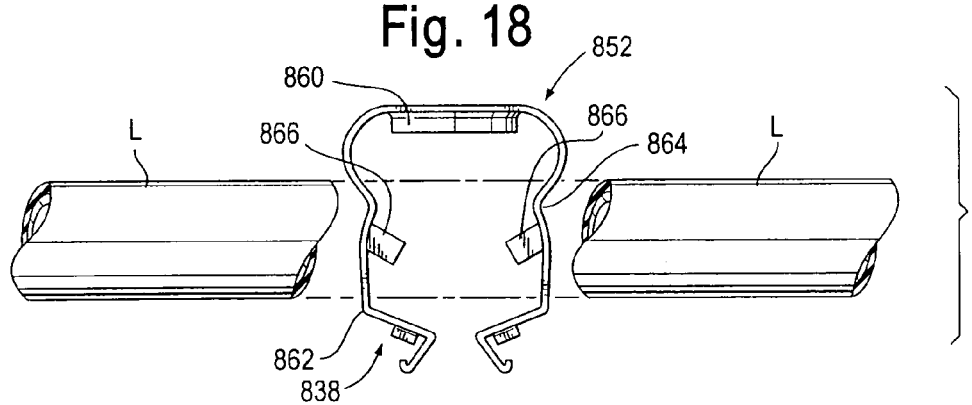
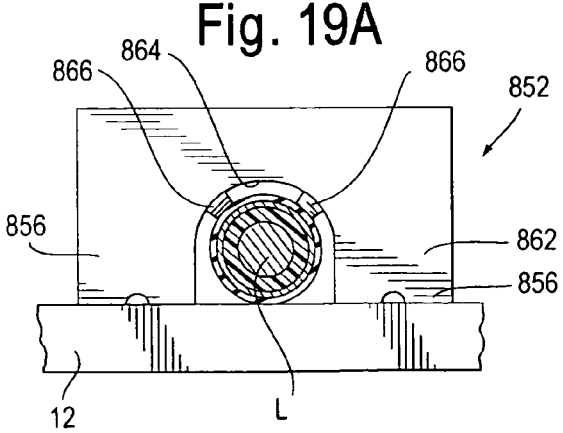

ANCHOR RAIL ADAPTER AND HANGER AND METHOD

BACKGROUND OF THE INVENTION

This invention relates generally to an adapter and hanger for use with rail anchors. More particularly, the invention relates to an adapter and hanger or mount for mounting articles to rail-type anchors, i.e., anchor rails and a method of use.

In the construction industry, many articles, such as piping conduit, tubing and the like, are supported by various methods. One such method employs anchor rails as the structural "backbone" or support for these articles. The use of anchor rails is widespread in the construction trades as well as other construction-related industries.

Anchor rails are used for supporting myriad equipment items and transfer media (such as piping, tubing and electrical conduit). One widely recognized type of anchor rail and anchor rail accessories is UNISTRUT® brand framing members, bracket and fittings. The anchor rail is formed as a U-shaped channel having a pair of upstanding, opposing legs. Each of the legs has an inwardly extending wall and terminates in a downwardly oriented lip.

In order to attach the articles (e.g., piping, tubing or conduit supports) to the framing member or anchor rail, mounting arrangements are used that typically include a spring nut that fits within the channel and a plate or other member that fits over the channel. The spring nut includes flanges that permit inserting the spring nut into the channel and securing the nut between and under the opposing lips. A bolt is inserted through the article to be supported and threaded into the nut to secure the article in place.

Although these spring nuts are quite widely accepted and used, there are drawbacks. For example, each spring nut is fabricated from a number of parts, including a coil spring. As such, parts can separate and become misplaced, thus rendering the mounting arrangement unusable. In addition, attachment of an article to such a nut requires the use of tools, e.g., a wrench or socket, to properly secure the article to the nut.

Additionally, in the installation of towers or other supports for communications antennae, hangers are used to support and route the lines or cables that provide connection between the antennae and transmission/receiving equipment. In these installations, the transmission line hangers are affixed to structural members of, for example, the antenna tower and the like for supporting the various transmission lines to/from the antennae. An exemplary transmission line hanger is disclosed in Paske et al., U.S. Pat. No. 6,161,804, Paske et al., U.S. patent application Ser. No. 09/863,718, and Paske, U.S. Pat. No. 6,354,543 B1, which patents and patent applications are commonly assigned herewith and incorporated herein by reference.

Accordingly, there is a need for an anchor rail adapter that is usable with commonly known types of anchor rail supports. Desirably, such an adapter is readily attached or mounted to the anchor rail-without requiring tools. Most desirably, such an adapter is configured for use with a wide variety of articles typically mounted to such anchor rails. Also most desirably, such an adapter is a single or unitary member thus eliminating the possibility of misplacing various parts of the adapter, rendering the adapter unusable.

These and other features and advantages of the present invention will be apparent from the following detailed description, in conjunction with the appended claims.

BRIEF DESCRIPTION OF THE SEVERAL VIEWS OF THE DRAWINGS

The features and advantages of the present invention will become apparent upon reading the following detailed description and upon reference to the drawings wherein:

FIG. 15 is a perspective view of still another alternate adapter configured to snap into a rail;

FIG. 16 is an end view of the adapter of FIG. 15;

FIG. 17 is an end view of an alternate snap-in adapter, similar to that shown in FIG. 15;

FIG. 18 is an end view of still another stackable adapter/hanger member in which a line is held transversely in the adapter/hanger body;

FIG. 19A is a side view of the adapter/hanger of FIGS. 18–19;

DETAILED DESCRIPTION OF THE INVENTION

Figure 1:
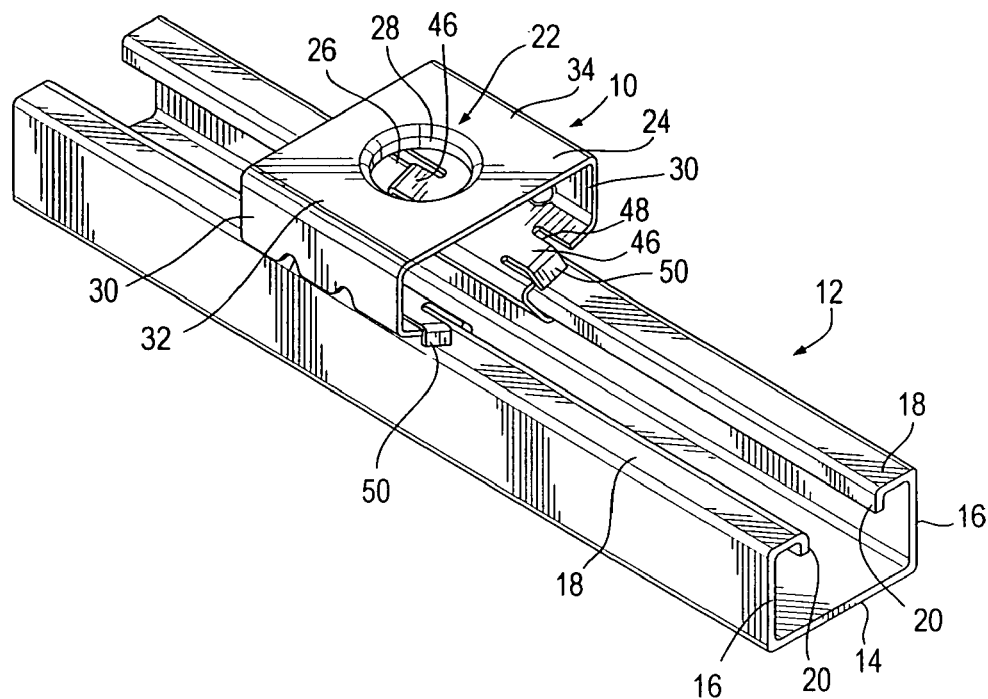
FIG. 1 is a perspective view of an adapter embodying the principles of the present invention, the adapter illustrated as mounted to an exemplary anchor rail.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

In the present disclosure, the words "a" or "an" are to be taken to include both the singular and the plural. Conversely, any reference to plural items shall, where appropriate, include the singular.

Referring now to the figures, and in particular to FIG. 1, there is shown an anchor rail adapter 10 embodying the principles of the present invention. The adapter 10 is configured for use with an associated anchor rail such as the exemplary, illustrated rail 12, which is representative of, for example, UNISTRUT® brand rail members.

Those skilled in the art will recognize the rail 12 as a channel having a base portion 14 and upstanding legs 16. The legs 16 typically have inwardly oriented walls 18, 118 (FIG. 3) and a lip 20, 120 (FIG. 3) extending downwardly from an inner end of each wall 18, when viewed in cross-section, as illustrated in FIG. 2.

Unlike known adapters or mounts that are used with anchor rails, the present adapter 10, 110 (FIG. 3) is a unitary element. That is, while known adapters require multiple elements and typically a biasing element (such as a coil spring), the present adapter 10, 110 (FIG. 3) is a single part that is readily snapped into place on the rail 12.

Figure 2:
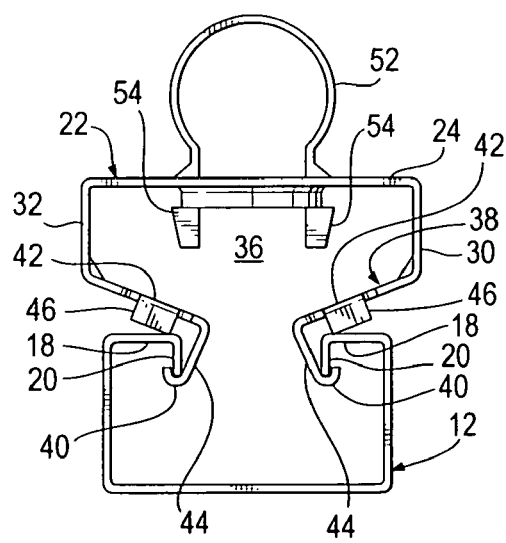
FIG. 2 is a side view of the adapter and anchor rail of FIG. 1 illustrated with a lower portion of a transmission line hanger mounted thereto.
Figure 3:
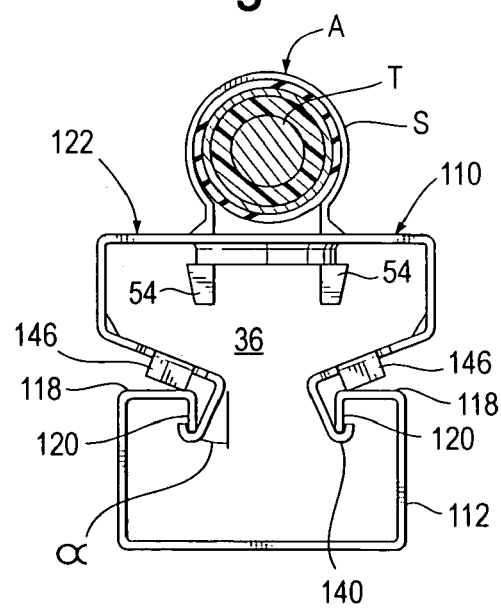
FIG. 3 is a side view of the adapter and anchor rail of FIG. 1 illustrated with a tubing support and tubing.
Figure 4A:
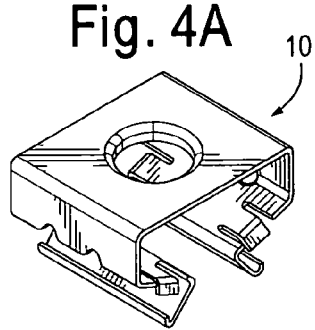
FIGS. 4A–4B are perspective and side views of the adapter of FIGS. 1–3.
Figure 4B:
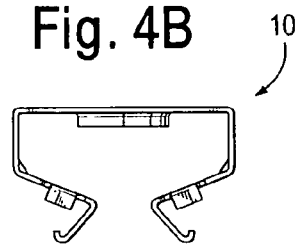

Referring now to FIGS. 2 and 3, the rail adapter 10 includes a mounting surface 22, 122 (FIG. 3) for mounting an article A to the adapter 10. Note that similar structures shown in FIG. 3 will be assigned a reference number greater by a value of 100 than corresponding reference numbers shown in FIG. 2. The mounting or attachment surface 22, 122 (FIG. 3) can, for example, be a top surface 24 of the adapter 10 and can include an opening 26 therein to, for example, receive a snap-lock or locking barbs 54 of a stackable hanger 52 such as that disclosed in the aforementioned patent to Paske et al., and as illustrated, in part, in FIG. 2. The opening 26 is defined by a locking shoulder or wall 28 that is configured for the hanger barb 54 to secure thereto, as described in more detail below. Those skilled in the art will recognize the wide variety of articles A that can be mounted to the anchor rail 12, 112 (FIG. 3) using the present adapter 10, 110 (FIG. 3), as will be presented in more detail below.

Spaced apart flanges 30 depend from the top surface 24. In a current embodiment, a pair of flanges 30 depend from the top surface 24, one flange 30 from each side 32, 34 of the top surface 24. That is, the flanges 30 are opposingly disposed on opposite sides 32, 34 of the top surface 24. The flanges 30 are configured to provide a space (indicated at 36) between the top surface 24 and the rail 12, and further, as described below, to provide a biasing function or element to the adapter 10. As best seen in FIG. 2, the space 36 between the flanges 30 further permits receipt of a fastening element, such as the transmission hanger barbs 54, without interference from the rail inward walls 18.

Mounting legs 38 extend inwardly, then downwardly, from ends of the flanges 30 distal from the top surface 24. The mounting legs 38 each terminate in a locking lip 40, 140 (FIG. 3). In a present embodiment, the locking lips 40, 140 (FIG. 3) are hook-like elements that extend outwardly and upwardly (relative to the inward 42 and downward 44 extensions of the legs 38), as seen in FIG. 2. The locking lips or hooks 40, 140 (FIG. 3) are configured to engage the rail lips 20, 120 (FIG. 3).

As such, each mounting leg inward portion 42 engages the rail inward wall 18 and the mounting leg downward portion 44 engages the rail lip 20. The hooks 40 extend around the lips 20 to secure the adapter 10 to the rail 12. In a current embodiment, the mounting leg downward portion 44 is formed at an angle α (FIG. 3) of about 20° to the vertical. This assures an outward bias of the downward portion 44 when the adapter 10 is positioned on the rail 12.

To enhance securing the adapter 10 to the rail 12, locking tabs 46, 146 (FIG. 3) extend downwardly from the inward mounting leg portions 42. The locking tabs 46, 146 (FIG. 3) are configured to bind on the rail inward wall 18 when the leg hooks 40 are positioned on the rail lips 20. In this manner, the adapter 10 is secured to the rail 12 by the clamping action of the tabs 46 and hooks 40 to the rail walls 18 and lips 20.

In a current embodiment, the tabs 46 are formed as part of the mounting leg inward walls 42 by notches 48 formed or cut in a portion of the wall 42 to define the tabs 46. Tab end portions 50 are bent or otherwise formed having a downwardly extending portion that bite into the rail inward walls 18. In that the notches 48 are formed extending into the walls 42, and the tabs 46 are bent downwardly (as at 50), the tabs 46 are biased to urge the biting portion 50 into the rail wall 18. This further enhances securing the adapter 10 in place on the rail 12. In the illustrated embodiment, the adapter 10 is formed having four such tabs 46 (three shown), two positioned on each end of the adapter 10, on opposing mounting legs 38.

As will be readily appreciated by those skilled in the art, the adapter 10 can be formed from steel or like materials having physical characteristics that permit the material to bend or to be bent, while maintaining resiliency (i.e., tending to return to an original shape). For moderate to light duty applications, the adapter 10 may be molded from a plastic resin. As such, various portions of the adapter 10 support the spring-like or biased mounting arrangement to the rail 12. For example, the flanges 30 are biased outwardly so that the legs 38 are urged against the rail inward wall 18 and lip 20. In addition, the bias of the legs 38 at the hooks 40, in conjunction with the bias of the biting portions 50 further enhances securing the adapter 10 to the rail 12. Moreover, the biased feature of the adapter 10 permits use of the adapter 10 with rails 12 having different sized openings or gaps between the lips 20.

As will also be appreciated by those skilled in the art, the present adapter 10 provides for readily mounting, removing and remounting an article A (such as the tube T or line L illustrated in FIGS. 3, 8 and 14) to the anchor rail 12, without the use of tools. That is, to install the adapter 10, the adapter 10 is positioned on the rail 12 by urging the flanges 30 toward one another against the bias (which can generally be done by hand). The hooks 40 are positioned under the rail lips 20, and the flanges 30 are released. This engages the hooks 40 with the rail lips 20 and locks the adapter 10 to the rail 12. A further advantage of the present adapter 10 is that the location of the adapter 10 along the rail 12 can be readily adjusted (again, generally without the use of tools), by urging the flanges 30 toward one another, sliding the adapter 10 to the desired location on the rail 12, and releasing the flanges 30.

Figure 8:
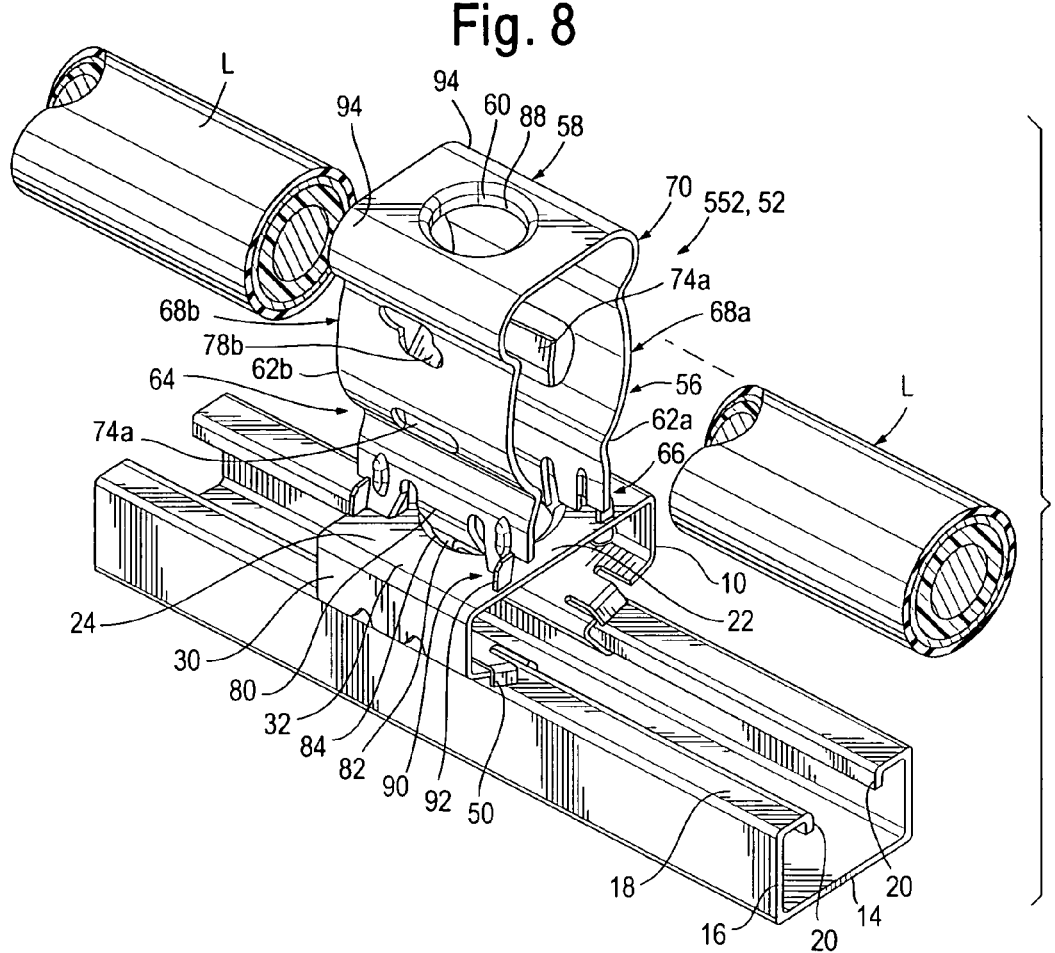
FIG. 8 is a perspective illustration similar to FIG. 1 illustrating a combination of the adapter configured with a stackable hanger, for supporting an article.

Referring now to FIG. 8, in one use as introduced above, a stackable line hanger 52 is provided for securing one or more lines, such as one or more conduit or transmission lines L to the adapter 10 and then to the anchor rail 12. An exemplary hanger 52 includes a line retention section 56 for accommodating a line (e.g., a conduit or transmission line L) and a mounting section 58 extending from the line retention section 56. The mounting section 58 includes a mounting hole 60 disposed therein. The line retention section 56 includes a first leg 62a and a second leg 62b extending therefrom. The first and second legs 62a and 62b allow the hanger 52 to accommodate various sizes of lines L. The first and second legs 62a and 62b each include the locking barb 54 configured to lock against an attachment surface, for example, to lock to the adapter 10.

The hangers 52 can be used in a stacked arrangement as will be described below to support one or more lines L, including transmission lines, coaxial cables and waveguides, electrical conduit, pneumatic and hydraulic lines and the like in generally parallel rows. The hanger 52 can accommodate a range of different line L diameters. A first row of the hangers 52 generally secures one line to a supporting structure, such as an adapter 10, a horizontal transmission line bridge, a vertical antenna tower, a building ceiling or wall surface or other mounting structure. One or more additional rows of the hangers, and as described below, can secure one or more additional lines L by attaching to the respective hangers 52 in the first row. The hangers 52 are easy to install because no ancillary hardware is required, such as nuts, bolts, or screws.

The illustrated hanger 52 is a unitary structure composed of metal or in moderate to light duty applications, of a plastic resin. In one embodiment, the hanger 52 is composed of stainless steel having a thickness of 0.76 mm and is generally U-shaped. The hanger 52 includes a mounting section 58, a transmission line retention section 56, an extended section 64, and an attachment section 66. The mounting section 58 extends from the retention section 56. The mounting section 58 includes a snap-in stacking provision, or a mounting hole 60 disposed therein. The retention section 56 includes two opposing curved members or arms 68a, 68b that accommodate a cylindrical line or article, such as a transmission line L, a pipe, a conduit or the like, exemplary of which is the illustrated transmission line. The curved members 68a, 68b include the first leg 62a and the second leg 62b, respectively, that comprise the extended section 64. The first and second legs 62a, 62b extend from the respective curved members 68a, 68b. A compliant area 70 is disposed between the mounting section 58 and the retention section 56 and allows the first and second legs 62a, 62b to be pressed towards each other and to expand away from each other by spring force.

In the illustrated hanger 52, the extended section 64 includes a pair of spring fingers (first and second spring fingers) 74a each projecting inwardly from the extended section 64 and into the retention section 56. The first leg 62a includes a spring finger 74a flexibly connected thereto and projecting inwardly therefrom. The second leg 62b includes a second spring finger 74a flexibly connected thereto and projecting inwardly therefrom. The spring fingers 74a are flexibly connected to the respective legs 62a, 62b such that when a transmission line L is inserted into the hanger 52, the spring fingers 74a flex outward with respect to the respective legs 62a, 62b and force the transmission line L against a pair of opposing line stops 78a, 78b. Thus, the spring fingers 74a provide spring resistance against the line L after it is inserted in the hanger 52.

When used with a line having a soft coating or jacket, such as certain transmission lines L, the spring fingers 74a can penetrate or bite into the jacket of the transmission line L to further secure the transmission line L within the hanger 52. The spring fingers 74a and the stops 78 help minimize the longitudinal movement of the line L in the hanger 52 even on smooth (non-corrugated) lines L. Longitudinal movement is defined as movement in a direction parallel to the length of the line L.

Returning to FIG. 2, the stackable, snap-in hanger 52 requires no additional hardware to install it to an attachment surface. Thus, the hanger 52 includes the spring fingers 74a (see FIG. 8) which help to minimize line L vibration, particularly with transmissions lines. In addition, the hanger 52 insures that an improper amount of torque is not applied to a hanger 52 assembly because there is no additional hardware required to fasten the hanger 52 to an attachment surface such as the adapter 10.

The compliant area 70, in conjunction with the spring fingers 74a allows the hanger 52 to have the compliance necessary to accommodate a large range of different line L diameters. The extended section 64 has the compliance to allow the hanger 52 to accommodate a large range of line L diameters and still allow the attachment section 66 to be inserted with moderate force into an aperture 26 in an attachment surface, such as the adapter 10, a supporting structure or the mounting hole of another hanger, as shown in FIG. 8, and the like.

Moreover, the extended section 64, in conjunction with the pair of spring fingers 74a allows the hanger 52 to accommodate a range of different line L diameters by having the compliance to expand for larger lines L. The extended section 64 and the spring fingers 74a also have the compliance to allow the hanger 52 to accommodate a large range of line L diameters while still allowing the attachment section 66 to be inserted into an attachment surface aperture 26.

Unlike prior hangers, the shape of the retention section 56 and the attachment section 66 of the hanger 52 do not change significantly in response to supporting different diameter lines L. The flexibility of the spring fingers 74a allows the spring fingers 74a to flex inward with respect to the extended section 64 after a line L has been inserted into the retention section 56. The flexibility of the extended section 64 allows the attachment section 66 to be inserted into an aperture 26 in an attachment surface (e.g., an adapter 10) with significantly reduced insertion force, and without significantly changing the shape of the line retention section 56 despite different diameter lines L being supported by the hanger 52.

Returning to FIG. 8, the attachment section 66 includes a first section 80 that extends from each of the first and second legs 62*a*, 62*b* respectively. A second section 82 extends from the first section 80 and forms the locking barb 54 (FIGS. 2 and 3) that is configured to lock against an attachment surface 22 of the adapter 10 once the locking barb 54 is inserted through the aperture 26 in the adapter 10. In one embodiment, the locking barb 54 is integral with the second section 82 and extends from and is generally orthogonal thereto. Each locking barb 54 includes a barb contact point or line 84 for contacting the attachment surface. In another embodiment, the locking barb 54 is integral with the second section 82, but also includes a curved, folded-over rib 86 (not shown). The folded-over rib links the second section 82 and the locking barb 54. The folded-over rib can be curved to provide greater strength to the locking barb 54, which increases the ability of the locking barb 54 to grasp the edge of the aperture 26.

The locking barb 54 can be dimensioned to match the shape of the aperture 26 of the attachment surface (the adapter 10). For example, in an embodiment where the aperture is circular, the locking barb is curved to match the curvature of the aperture. If the aperture is square, then the locking barb can be formed with a straight edge to match the side of the aperture. Configuring the locking barb to match the shape of the aperture creates a stiffer locking barb that is able to better grasp the aperture.

FIGS. 2 and 8 shows how the attachment section 66 is secured to the supporting structure which can include, for example, the adapter 10, a horizontal transmission line bridge or a vertical antenna tower. The supporting structure includes the exemplary circular aperture 26 defined by a wall 28. The first section 80 contacts the wall 28 at one or both of a pair of contact points 84. The locking barb 54 is configured to lock against the adapter 10 once the locking barb 54 is inserted through the aperture 26. The adapter 10 includes an outer surface and an inner surface. The surfaces of the supporting structure may be rough due to, for example, irregularities, bubbles, and/or barbs caused by the galvanizing process and/or the punching process that produces the aperture. Therefore, the hanger 52 is designed such that each locking barb 54 contacts the inner surface of the supporting structure at the barb contact line or point 84. Because the hanger 52 includes two locking barbs 54, one on each leg 62*a*, 62*b* the hanger 52 can be more securely attached to the supporting structure (e.g., the adapter 10), despite any irregularities on the inner surface.

The wall 28 of the aperture 26 may also be rough because of irregularities, bubbles, and/or barbs caused by the galvanizing process and/or the punching process that produces the aperture. Therefore, in one embodiment, contact with these irregularities is minimized by having the first section 80 of the hanger 52 only contact the wall 28 at one or both of the pair of contact points 84 instead of, e.g., a curved surface contacting a large portion of the wall.

Figure 14:
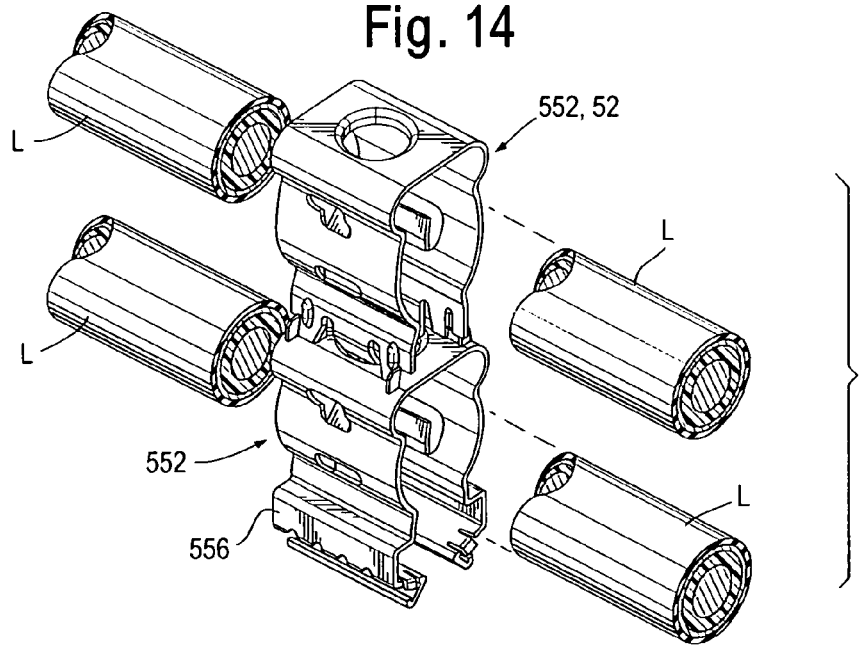
FIG. 14 is a perspective view of the adapter/hanger combination member with an addition hanger mounted thereto in a stacked configuration, and illustrated with a pair of lines for clarity of understanding.

FIG. 14 shows how the attachment section 66 of the hanger 52 is secured to the mounting section of another hanger 552 (e.g., in a stacked arrangement, in which the other hanger is an adapter/hanger member 552, as will be described below). Alternately (though not shown), the mounting section can include a square mounting hole disposed therein. The locking barb is configured to lock against the mounting section once the locking barb is inserted through the mounting hole. The square mounting hole is defined by a wall having a pair of opposing lips. The square mounting hole provides an anti-rotation feature that keeps the hangers aligned. Specifically, the locking barb includes a notch that is configured to lock against the lip of another hanger once the locking barb is inserted through the mounting hole and the first and second legs are released. The notch insures that the second row hanger is aligned with the first row hanger. The aligned hangers insure that the transmission lines secured therein are generally parallel to each other. The notch in each locking barb insures a secure connection between each additional hanger. The notches lock the distal end of both legs against the opposing lips of the mounting section of another hanger (e.g., the stacked arrangement).

Figure 13:
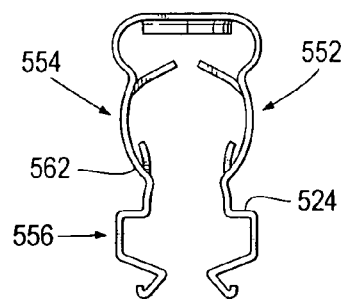
FIG. 13 is an end view of the adapter/hanger combination member.

As illustrated in FIGS. 8, 13 and 14, the mounting hole 60 can be circular in shape and can include a lip 88 (or stiffening flange) that encompasses the entire mounting hole 60. By having a lip 88 that encircles the entire mounting hole 60, the locking barb 54 is less likely to disengage from the lip 88 and slip out. Further, the lip 88 strengthens the hole 60 against tearing or deformation, The depth of the lip 88 can be configured to simulate the thickness of a typical tower structural support.

Moreover, adding an additional row of hangers to a prior row of hangers (e.g., the stacked arrangement) produces a "chaining effect." The resulting assembly of hangers is not rigid; rather, the assembly is able to flex between the hanger pairs. Therefore, the problems of side loading produced by a rigid hanger assembly attached to an antenna tower are reduced. For example, a rigid assembly acts as a lever arm which reduces the force required to pull the rigid hanger assembly from its supporting structure. With the chaining effect produced by the hangers, however, the side loading is distributed through the various attachment and mounting sections of the multiple hangers, rather than transferring the entire load back to the base hanger. Therefore, the load is shared by the hangers. Thus, the hangers can act as a "spring" during a wind gust rather than as a rigid member. This "spring" effect dampens the cable vibration and makes the transmission lines secured by the hangers less likely to be blown off the supporting structure. Further, the "give" in the joints of a chained assembly of hangers dampens vibrations in the supported lines, thus mitigating undesired loosening of transmission line connectors by vibration in the connected lines.

The hanger 52 also includes stop arms 90 (best seen in FIG. 8) that extend down from the first and second legs 62*a,b* to help decrease the likelihood of the hangers 52 breaking or becoming disengaged during a wind gust. When the hanger 52 is attached to the attachment surface 22 of the adapter 10, the stop arms 90 rest against the top 24 of the attachment surface and provide support. In one embodiment, the stop arms 90 are a gussetted flap of metal.

The stop arms 90 can include a bent portion that defines out-turned sides 92, that are generally orthogonal to the first and second legs 62*a,b*. The out-turned side 92 acts like a brace on the attachment surface 10 if the hanger 52 were to sway due to wind. The out-turned sides 92 are structured to engage or dig into the attachment surface 22. More specifically, the out-turned sides 92 include a sharp point that digs into the attachment surface 22, effectively gripping the surface during high wind gusts. Thus, the attachment section 66 stays centered over the aperture 26 of the attachment surface 22, keeping the locking barbs 54 in place. Also, the out-turned sides 92 along with the in-turned sides on the stop arms 90 create a wider "footprint" on the top 24 of the attachment surface 22. The wider "footprint" decreases the likelihood of the attachment section 66 disengaging from the attachment surface 10.

As best shown in FIG. 8, the compliant area 70 is provided by a fulcrum or bend 94. The compliant area 70 enables the first and second legs 62a,b to be pressed together, thus, allowing the locking barbs 54 to fit through an aperture 26 in an attachment surface 22 of the adapter 10. The compliant area 70 also allows the first and second legs 62a,b to expand by spring force once the locking barb 54 is inserted through the aperture 26. This expansion brings the first section 80 into contact with, e.g., the wall 28 of the aperture 26 at one or both of the pair of contact points 84.

The design of the hanger 52 and, in particular, the extended section 64 allows for easy installation of the hanger 52. Specifically, the extended section 64 allows larger diameter lines L to be inserted into the hanger 52. The user then wraps his or her fingers around the hanger 52, and the line L therein, and presses the legs 62a,b together. The extended section 64 places the retention section 56 further away from the attachment surface 22 of the adapter 10, the supporting structure or the mounting section. In addition, the attachment section 66 is closer to the user's fingers and thumb, thus, allowing a greater range of motion and greater force to be applied to the hanger 52 when inserting the attachment section 66 into an attachment surface 22 and reduces the required insertion force. The extended section 64 also gives the user more room to work, and avoids the user's hands from hitting the attachment surface 66 during installation. The mounting section 58 further extends the distance the user's fingers and thumb are from the attachment surface 22.

The design of the hanger 52 and, in particular, the extended section 64 also provides a more dynamic snap-in action than prior hangers when the hanger 52 is installed into an attachment surface 22. The two locking barbs 54 also provide less insertion resistance than prior hanger designs having four locking barbs. Having only two locking barbs 54 reduces the number of contact points that must contact, for example, the outer surface of the supporting structure during insertion of the hanger into the supporting structure. Additionally, the two barb 54 design of the attachment section 66 reduces insertion resistance by reducing the cam pressure required and the amount of deflection required to insert the hanger 52 into the attachment surface 22. This reduces the amount of force required to insert the hanger 52 into, for example, an adapter 10, a supporting structure or a mounting section of another hanger 52. The hanger 52, thus, requires less manual dexterity to install and uninstall than prior hangers.

In addition, the ergonomic design of the hanger 52, including the extended section 64, allows for easier installation. These are important features, especially where the typical exemplary transmission line L is in excess of 1,000 feet in length and a hanger 52 is mounted every three feet. Consequently, hundreds of hangers 52 must be installed to support such a transmission line L. The hours required to install that many hangers 52 is great. Accordingly, transmission line L installation is costly. In addition, it can be difficult to find someone willing to install transmission line hangers 52 high above the ground, especially if extra hardware is required to install the hangers 52. Therefore, a hanger 52 that requires less installation time and is easier to install reduces the number of hours required for installation, thus, reducing installation costs.

In use, the hanger 52 may be installed easily and quickly by pulling apart the legs 62a, 62b and slipping the hanger 52 over the line L such that the curved members 68 are disposed around the line L and the spring fingers 74a are forced against the line L, thus, pressing the line L against the opposing line stops 78. The legs 62a, 62b are then pressed together to allow the locking barbs 54 to be inserted through the aperture 26 in an attachment surface, such as the adapter 10, as illustrated in FIG. 8. The hanger 52 is inserted into the aperture 26 until the first sections 80 snap into contact with the top surface 24 or mounting surface 22 at one or both of the pair of contact points 84 and the barb 54 contact point contacts the inner surface of the adapter 10, as illustrated in FIG. 2. This process is repeated for each hanger 52 that is installed into like adapters 10 along the length of the line L. Likewise, the legs 62a, 62b are pressed together to allow the locking barbs 54 to be inserted through the mounting hole 60 in the mounting section of another hanger (such as the adapter/hanger 552, as illustrated in FIG. 14). Then, the legs 62a, 62b are released and the spring force provided by the compliant area 70 expands the legs 62a, 62b until the barbs 54 locks against the lip 88, as best illustrated in FIGS. 2 and 8.

This process is repeated for each hanger 52 that is installed as an additional row onto a previously installed hanger(s). Thus, for example, each additional transmission line L run that is added to, e.g., an antenna tower is independent of the previous transmission line L run. In other words, each additional hanger 52 can be installed independent of, and without unassembling, the prior hanger(s).

The hanger 52 can also be readily uninstalled and reused in another location. To uninstall the hanger 52, the legs 62a, 62b are pressed together to allow the locking barbs 64 to be removed from the attachment surface 22. Next, the retention section 56 is slipped off the transmission line L by pulling apart the legs 62a, 62b and disengaging the spring fingers 74a from the transmission line L jacket.

One aspect of the present invention provides a one piece, stackable transmission line hanger 52 that is inexpensive to produce. For example, the typical cost of a traditional hanger capable of holding three transmission lines is about three times greater than the cost for three ⅞" diameter stackable hangers (this estimate depends on the style and amount of hardware required for the traditional hanger). Moreover, the additional hangers do not need to be bought until the additional transmission line runs are added. Thus, the extra cost for the additional hangers can be deferred until the additional transmission line runs are actually installed.

Therefore, the present invention provides a stackable line hanger 52 (e.g., for a transmission line, pipe or conduit) capable of securing one or more pipes, conduit or lines L to an attachment surface. The stackable hanger 52 is expandable to accommodate additional lines L without disassembling the prior hanger(s) 52, is expandable to accommodate a large number of line L diameters, is inexpensive to produce, and is quickly and easily installed. In addition, the stackable hanger 52 reduces the number of components required to secure one or more lines L, reduces installation time, reduces longitudinal movement of the line L within each hanger 52, and allows for simple installation of additional lines L.

Figure 5A:
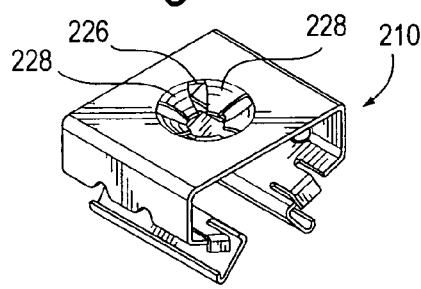
FIGS. 5A–5B are perspective and top views of an alternate embodiment of an adapter that includes inwardly/downwardly oriented projections for receiving a push-pin type of fastener.
Figure 5B:
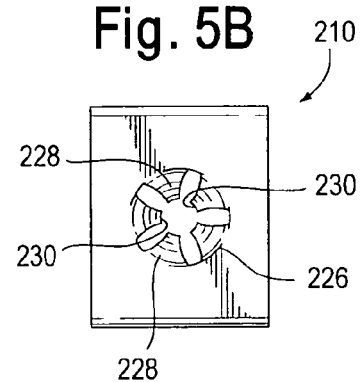

The adapter 10 can also be used to mount a wide variety of other articles A to the rail 12. For example, as illustrated in FIG. 3, the adapter 110 can be used to mount conduit, pipe or tubing T held by a tubing support S to the rail 12. Referring now to FIGS. 5A–B through 7A–B, there are shown various alternate embodiments of the adapter. FIGS. 5A and 5B illustrate perspective and top views, respectively, of an adapter 210 that is configured for receipt of a friction or "push-pin" type of fastener (not shown), which type of fastener will be recognized by those skilled in the art. The adapter 210 includes an opening 226 bounded by a plurality of inwardly/downwardly projecting friction tabs 228. Because of the inward/downward orientation or angle or the tabs or projections 228, the fastener readily inserts into the opening 226 (urging the tabs 228 outwardly), but removal is resisted by engagement of the fastener with the ends 230 of the tabs 228.

Figure 6A:
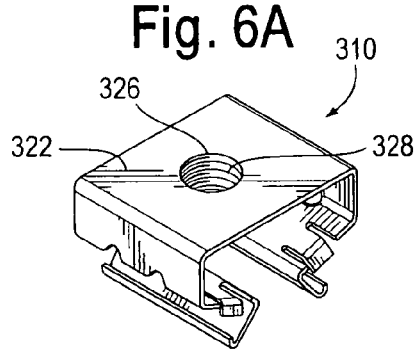
FIGS. 6A–6B are perspective and side views of still another embodiment of the adapter having a threaded depending collar.
Figure 6B:
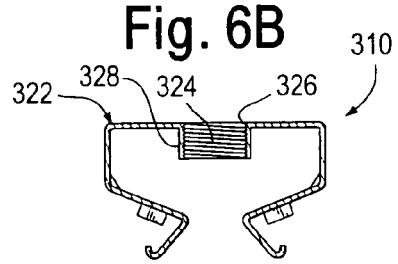
Figure 7A:
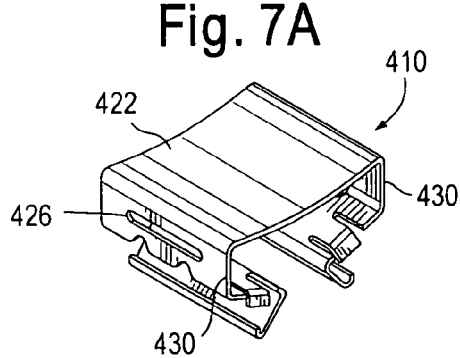
FIGS. 7A–7B are perspective and side views of yet another embodiment of the adapter illustrated with a curved mounting surface and flange slots for receiving a support element.
Figure 7B:
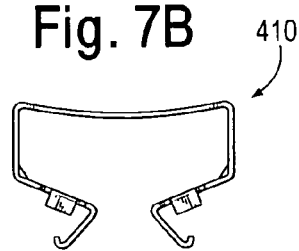

FIGS. 6A and B illustrate perspective and side views of another alternate embodiment of an adapter 310 that is configured for receiving a threaded shank or stud, such as a bolt (not shown). Threads 324 are formed in a sleeve or collar 328 that depends from the periphery of an opening 326 formed in the top mounting surface 322. FIGS. 7A and B illustrate still another alternate embodiment of an adapter 410 that is configured to receive a strap-type support (not shown). Slots 426 are formed in the flanges 430 depending from the top mounting surface 422 that are configured for engaging ends of the strap. Those skilled in the art will recognize these straps as well as other configurations that can be used with this embodiment 410 of the adapter 410. Also as illustrated, the top mounting surface 422 can be curved or arcuate (as illustrated in FIGS. 7A and 7B) to conform to the shape of a pipe or conduit (e.g., electrical conduit) that rests on the adapter 410. Of course, such an adapter 410 can also be configured with a planar or flat top surface having suitable saddles or the like (not shown) for securing a pipe or conduit thereto.

Figure 9:
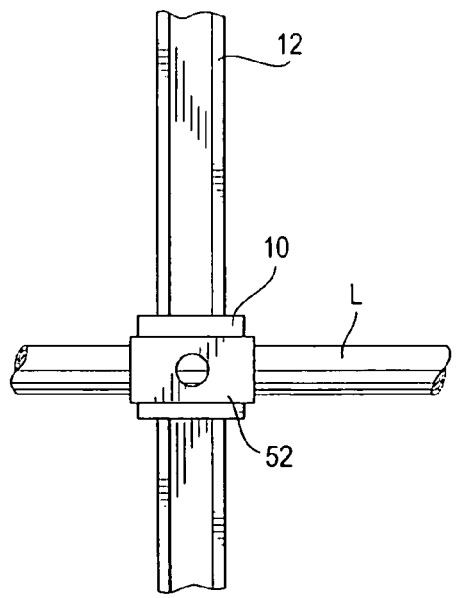
FIGS. 9–11 illustrate various orientations of the adapter in which the adapter can be used, the adapter being mounted to an anchor rail and shown with the rail oriented horizontally and vertically, and with the adapter positioned for routing a line transverse to the anchor rail (FIG. 9), parallel to the anchor rail (FIG. 10) and at an angle to the rail (FIG. 11)
Figure 10:
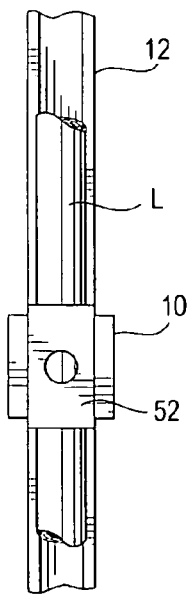
Figure 11:
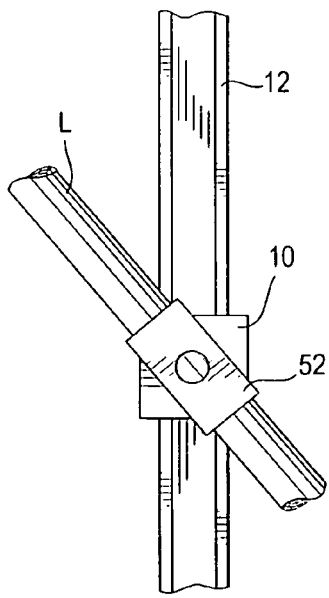

As will also be appreciated by those skilled in the art, because of the biased (i.e., sprung) engagement of the adapter 10 to the rail 12, the adapter locks into the rail and can be used in any orientation. That is, although the present description and figures illustrate the adapter used with a rail 12 that is oriented horizontally with the rail open portion upward, the present adapter 10 can in fact be used with the rail in upside-down, or vertical orientations. In addition, as will also be appreciated by those skilled in the art, because of the swivel engagement of the hanger 52 to the adapter 10, the line L orientation can be independent of the rail 12 orientation (as seen in FIGS. 9–11), and thus at any angle relative to the rail 12.

Figure 12:
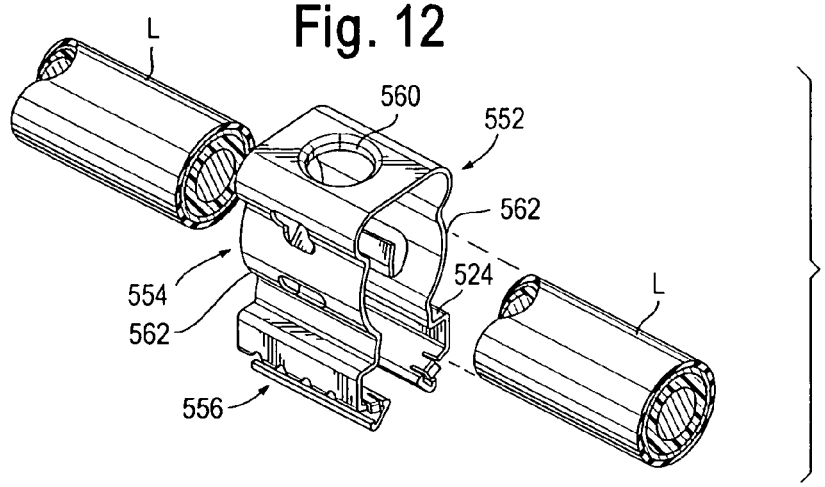
FIG. 12 is a perspective view of an alternate embodiment of the present invention, in which an adapter and a hanger are formed as a unitary member, and shown, in part, with a line, such as a conduit for clarity of understanding.

Referring now to FIGS. 12–14, there is shown an adapter/hanger member 552. In this member, a hanger portion 554 is formed integral with an adapter portion 556, such that the top surface 524 of the adapter portion 556 extends from a lower region of the spring legs 562. The remaining portions of the hanger portion 554 and the adapter portion 556 are as describe above. This configuration facilitates installation of lines L (e.g., pipe, conduit and transmission lines) to the underlying supporting rails 12 by use of a single part or member, rather than two separate items. As seen in FIG. 14, the hanger portion 554 of the member 552 can be configured having an aperture 560 at the top of the hanger 552 for receipt of the locking barbs 54 from a "stacked" hanger 52.

FIGS. 15–16 illustrate still another embodiment of the adapter 610 in which the mounting legs 638 converge at an uppermost region, as indicated at 640, of the adapter 610. This configuration facilitates readily installing the adapter 610 to an associated rail 12 simply by snapping the adapter 610 into the space between the rail inward walls 18. The converging legs 638 facilitate this installation by providing surfaces 642 against which the rail walls 18 bear to urge the legs 638 toward one another to fit into the rail 12. Once the ends of the legs 638 are fully inserted into the rail 12 opening, the legs 638 spring outwardly to lock the adapter 610 to the rail 12.

FIG. 17 illustrates an alternate embodiment 710 of the insertion-fit adapter 610 of FIGS. 15–16. In this embodiment of the snap-in adapter 710, the engaging or snap surfaces 742 extend fully along the length of the adapter 710, rather than along only a portion of the adapter length, as shown in the embodiment 610 of FIGS. 15–16. It will be appreciated that while these embodiments of the adapter 610, 710 can be used in a variety of applications, they are well suited for hanging applications. That it, when mounted to a rail 12 that is ceiling mounted, the locking engagement of the legs 638, 738 to the rail lips 20 provides an increased "pull-out" force to pull the adapter 610, 710 from the rail 12.

Figure 19:
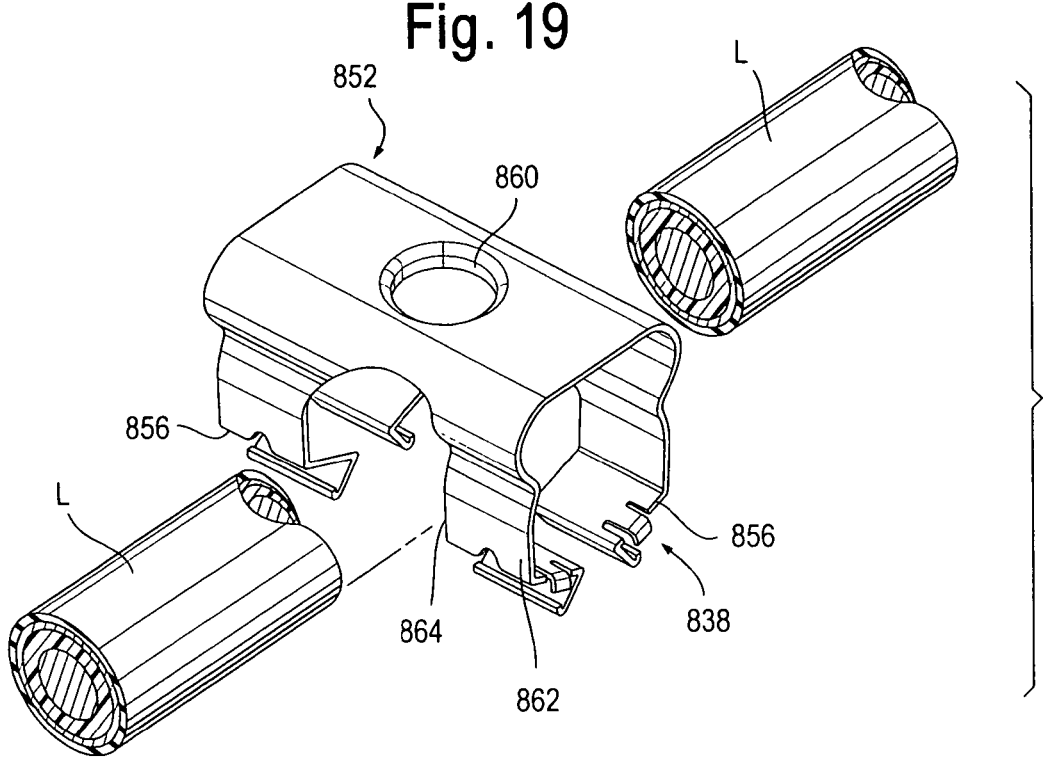
FIG. 19 is a perspective view of the adapter/hanger of FIG. 18.

FIGS. 18, 19 and 19A illustrate an adapter/hanger member 852 configured to support an article A (such as the illustrated line L) transverse to the adapter/hanger 852. In this embodiment, the adapter legs 838 are formed as part of the hanger spring legs 862. The spring legs 862 can include an opening 864 therein adapted to receive the line L traversing therethrough. The opening 864 splits or forms two adapter portions 856. Inwardly extending fingers 866 are configured to resiliently engage the line L as it traverses through the member 852 to support and secure the line L. The fingers 866 permit the adapter/hanger 852 to accommodate conduit, piping, lines and other articles of varying diameters. The member 852 can include an aperture 860 at an upper region for receiving a stacked hanger such as, for example, the hanger 52 illustrated in FIG. 8.

Figure 20:
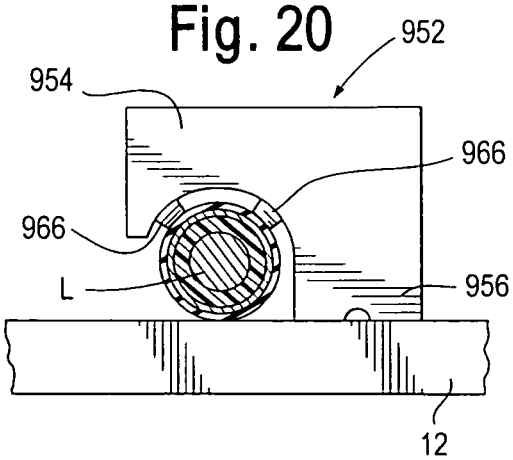
FIG. 20 is a side view of an alternate embodiment of a transversely supporting adapter/hanger combination member.

FIG. 20 illustrates still another embodiment of an adapter/hanger member 952 that includes one adapter portion 956 for engaging the rail 12, and a support portion 954 having inwardly extending fingers 966 for resiliently engaging the line L. This member 952 is similar to the member 852 illustrated in FIGS. 18–19A, except that it includes one adapter portion 956, rather than two adapter portions 856 of the previous embodiment 852.

Figure 21:
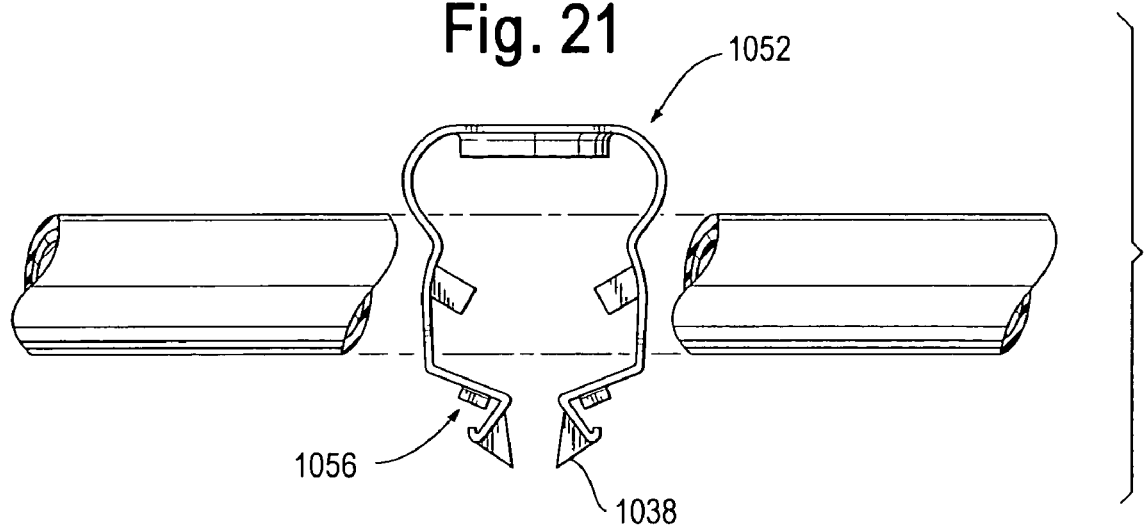
FIG. 21 is still another alternate embodiment of an adapter/hanger member similar to that of the embodiment of FIGS. 18 and 19, and having a snap-in configuration similar to that of the embodiment of FIGS. 15 and 16.

FIG. 21 illustrates an adapter/hanger member 1052 formed similar to that of the embodiment 852 of FIGS. 18–19A, with the adapter portion 1056 of the snap-in embodiment 610 illustrated in FIGS. 15–16. This member 1052 is configured having inwardly or converging legs 1038 for snap-in insertion into a rail 12 space and locking to the rail 12.

Figure 22:
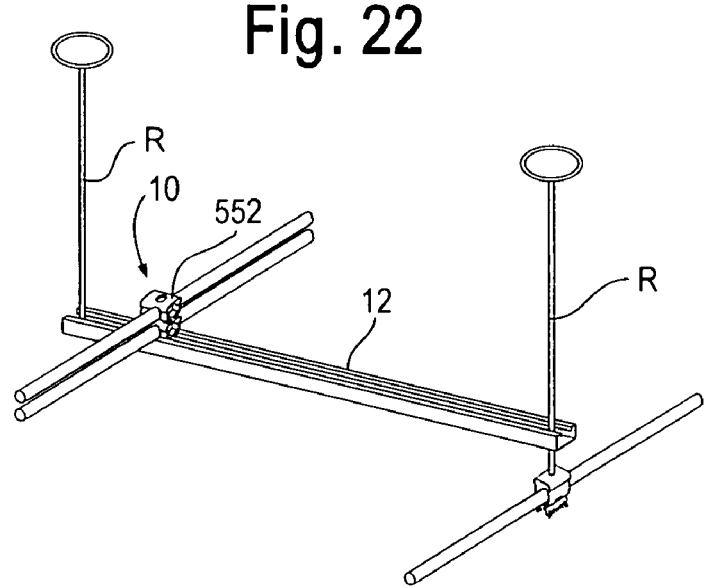
FIG. 22 illustrates an anchor rail used as a trapeze support and showing still another configuration in which the adapter and adapter/hanger combination member can be used.

FIG. 22 illustrates one arrangement, commonly referred to as a trapeze support, for supporting lines, such as conduit, piping and the like. The trapeze support is formed from a rail 12 supported by, for example, threaded rods R secured to a ceiling surface. The rail 12 can be used to support multiple lines L with the adapters and adapter/hanger members disclosed above.

Figure 23:
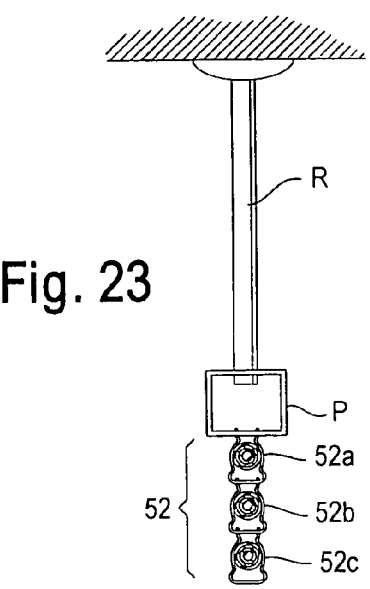
FIG. 23 illustrates a configuration in which stackable hangers are supported by a rod, such as a threaded rod, that is hung from a ceiling.

FIG. 23 illustrates a stacked or chained arrangement in which hangers, such as hanger 52, are supported or hung directly from a rod R. Those skilled in the art will recognize that often, these rods R are threaded. In this arrangement, the hangers 52 can be configured such as that illustrated in FIG. 8. In this arrangement, a coupling P can be used to couple the first hanger 52a to the rod R. The subsequent hangers 52b and 52c then stack or hang from the first hanger 52a or from one another to form the chained arrangement. Those skilled in the art will also recognize that the first hanger 52a can be hung directly from the rod R. To this end, the opening in the hanger 52a can be formed as a bore configured to receive the rod R (with a nut, not shown, to secure the hanger 52a to the rod R), or the opening can be threaded to directly receive the rod R. A simple clamp, washer or the like W (FIG. 27) can be used at the terminal end of the chain to close the last hanger 52.

Figure 24:
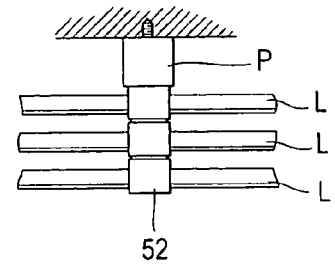
FIG. 24 illustrates a ceiling mount or coupling for the stackable hanger of FIG. 23.
Figure 25:
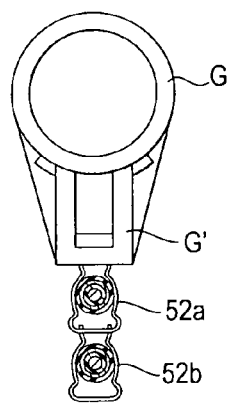
FIG. 25 illustrates a line or pipe mount from which a stackable hanger series can be supported by an overhead line or pipe.
Figure 26:
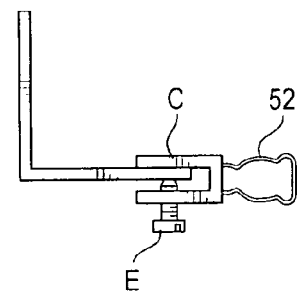
FIG. 26 illustrates a structural member mount for a stackable hanger.
Figure 27:
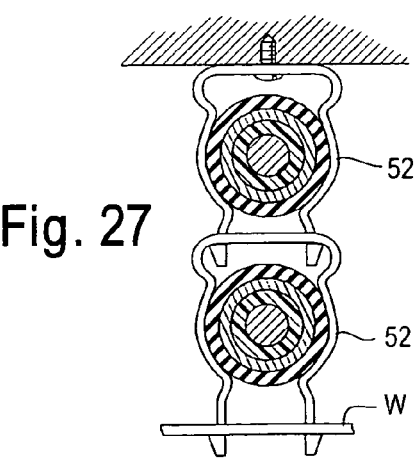
FIG. 27 illustrates a hanging stacked configuration of the stackable hangers, the first hanger being directly mounted to a ceiling or other foundation.

FIGS. 24, 25 and 27 illustrate variations of the stacked or chained arrangement. FIG. 24 illustrates the hangers 52 mounted to a ceiling from a coupling P. FIG. 25 illustrates an arrangement in which the first hanger 52a is mounted to an overhead pipe or line G, by an alternate coupling G'. FIG. 26 illustrates a configuration in which the hanger 52 is attached to a structural member mount (e.g., beam clamp C) by an exemplary threaded clamping element E.

Figure 28:
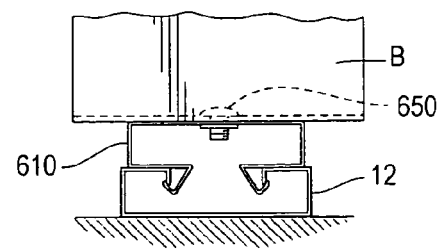
FIG. 28 is a side view of still another alternate configuration in which the adapter of FIGS. 1–3 is used to attach an electrical or other box to an anchor rail.

FIG. 28 illustrates an arrangement in which an equipment item, such as a junction box, electrical connection box, instrument box (indicated at B) or the like is supported from a rail 12 by an adapter, such as, for example, the adapter 610 illustrated in FIGS. 15–16, or the adapter 10 illustrated in FIGS. 1–6A. In such an arrangement, the box B can be mounted to the adapter by a bolt 650 or like fastener, and the adapter 610 can be snapped into the rail 12. In this arrangement, the box B can be mounted to any surface (e.g., ceiling or wall) or supporting structure to which the rail 12 can be mounted.

To this end, the adapter and the adapter/hanger member and associated rail 12 have been described as having downwardly, upwardly, inwardly and outwardly oriented portions, for ease of description only. As such, the invention is not to be bound by any of these orientations themselves, but is best understood when these orientations are taken in context with the structural and functional features of the present invention. To this end, as described above and as best seen in FIGS. 9–11, the rails and adapter and adapter/hanger member can be used to support conduit, piping and lines in various orientations, e.g. mounted horizontally, vertically, with the conduit, piping or line parallel to the rail (FIG. 10), transverse to the rail (FIG. 9), and at an angle to the rail (FIG. 11).

It is also known to construct racks and the like from anchor rails 12. That is, rails 12 can be used in a free-standing arrangement as vertical and horizontal supports for electrical junction boxes and termination boxes as well as for supporting mechanical equipment such as valves and the like, as described above. It is anticipated that the present adapter and adapter/hanger can be used in these applications as well.

Those skilled in the art will recognize the myriad advantage and benefits of the present adapter and adapter/hanger member. For example, the chained or stacked configuration can "grow" from either direction (i.e., from the feet or barbs, or from the top/aperture), and can be mounted from a surface, such as a wall or ceiling, as well as a rail. Essentially, the adapter can be used to provide and opening or aperture "in space," that is by recognized attachment to a structural member, surface or support, from which hangers and adapter/hanger members can be supported.

The present adapter and adapter/hanger members provide design and installation flexibility in that lines (such as transmission lines, piping, conduit and the like) can be routed parallel, transverse and at angles to rails from which they are supported. In addition, when mounting to a surface, again, any angle for routing can be carried out.

Also possible is the routing of different types of lines. For example, electrical conduit and pneumatic piping/tubing can be carried by hangers in a single stack to facilitate installation and reduce installed costs.

The disclosure of each patent and patent application cited herein, whether or not done so specifically, is incorporated herein by reference.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. For use with an anchor rail formed as a U-shaped channel having a pair of upstanding, opposing legs, each leg having an inwardly extending wall and terminating in a downwardly oriented rail lip, an adapter configured to receive and releasably retain an associated article support hanger on the associated anchor rail, the adapter comprising:
   a mounting surface having an opening formed therein to releasably secure the article support hanger to the adapter;
   flanges depending from the mounting surface;
   mounting legs extending from the flanges, the mounting legs each having a hook-like portion for engaging the corresponding rail lip, the hook-like portion extending substantially along a width of the mounting leg; and
   the adapter being flexible to permit urging of the flanges inwardly toward each other to facilitate insertion of a portion of the mounting legs into the U-shaped channel, the adapter further being resilient such that the hook-like portions biasingly engage the rail lips, wherein the mounting legs include an inwardly extending portion contiguous with a downwardly extending portion, and wherein the hook-like portion is formed at an end of the downwardly extending portion.

2. The adapter in accordance with claim 1 including at least one binding element formed on at least one of the mounting legs.

3. The adapter in accordance with claim 2 wherein the binding element is disposed on the inwardly extending portion.

4. The adapter in accordance with claim 3 wherein the binding element is a tab formed in the inwardly extending portion and configured to bite into the rail if the adapter is translated longitudinally along the rail.

5. The adapter in accordance with claim 4 wherein the tab includes a downwardly bent portion configured to bite into a respective rail inwardly oriented wall.

6. The adapter in accordance with claim 1 wherein the mounting surface is a top surface.

7. The adapter in accordance with claim 1 wherein the mounting surface is planar.

8. The adapter in accordance with claim 1 wherein the mounting surface is curved.

9. The adapter in accordance with claim 1 including a collar depending from a periphery of the opening.

10. The adapter in accordance with claim 9 wherein the collar includes threads formed therein.

11. For use with an anchor rail formed as a U-shaped channel having a pair of upstanding, opposing legs, each leg having an inwardly extending wall and terminating in a downwardly oriented rail lip, an adapter configured to receive and releasably retain an associated article support hanger on the associated anchor rail, the adapter comprising:
   a mounting surface having an opening formed therein to releasably secure the article support hanger to the adapter;
   a plurality of downwardly/inwardly oriented projections extending from a periphery of the opening;
   flanges depending from the mounting surface;
   mounting legs extending from the flanges, the mounting legs each having a hook-like portion for engaging the corresponding rail lip, the hook-like portion extending substantially along a width of the mounting leg; and the adapter being flexible to permit urging of the flanges inwardly toward each other to facilitate insertion of a portion of the mounting legs into the U-shaped channel, the adapter further being resilient such that the hook-like portions biasingly engage the rail lips.

12. For use with an associated article support hanger and a strut-type channel, an article support hanger configured to retain a waveguide transmission line, or electrical, pneumatic, hydraulic or other utility line, the strut-type channel being generally U-shaped and having a pair of upstanding, opposing legs, each leg having an inwardly extending wall and terminating in a downwardly oriented rail lip, a unitary resilient coupling comprising:

an article support hanger receiving portion configured to receive and releasably retain the associated article support hanger;

opposed mounting legs having feet configured to engage corresponding channel lips of the strut-type channel to securely lock the unitary resilient coupling into the channel when the legs are pinched together to fit within the channel, and released so as to expand and biasingly contact the corresponding channel lips said resilient coupling further including a threaded opening adapted to be retentively engaged by the article support hanger; and wherein said opening is surrounded by radial friction tabs.

* * * * *